(12) United States Patent
Maekawa

(10) Patent No.: US 10,528,278 B2
(45) Date of Patent: Jan. 7, 2020

(54) DATA PROCESSING APPARATUS, DATA PROCESSING METHOD, AND COMPUTER READABLE MEDIUM

(71) Applicant: MITSUBISHI ELECTRIC CORPORATION, Tokyo (JP)

(72) Inventor: Takuya Maekawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 87 days.

(21) Appl. No.: 15/772,362

(22) PCT Filed: Dec. 18, 2015

(86) PCT No.: PCT/JP2015/085583
§ 371 (c)(1),
(2) Date: Apr. 30, 2018

(87) PCT Pub. No.: WO2017/104084
PCT Pub. Date: Jun. 22, 2017

(65) Prior Publication Data
US 2018/0335969 A1    Nov. 22, 2018

(51) Int. Cl.
G06F 12/00     (2006.01)
G06F 3/06      (2006.01)
G06F 9/38      (2018.01)

(52) U.S. Cl.
CPC .......... G06F 3/0631 (2013.01); G06F 3/0611 (2013.01); G06F 3/0626 (2013.01);
(Continued)

(58) Field of Classification Search
None
See application file for complete search history.

(56) References Cited

U.S. PATENT DOCUMENTS 7,542,010 B2 * 6/2009 Lai .................. G06F 3/1431
345/1.1
2004/0135789 A1 * 7/2004 Yu .................... G09G 5/399
345/531

(Continued)

FOREIGN PATENT DOCUMENTS

JP    2007-249010 A    9/2007
JP    2008-197394 A    8/2008
(Continued)

OTHER PUBLICATIONS

International Search Report for PCT/JP2015/085583 dated Mar. 15, 2016.

*Primary Examiner* — John A Lane
(74) *Attorney, Agent, or Firm* — Birch, Stewart, Kolasch & Birch, LLP

(57) ABSTRACT

A storage area setting unit sets (2M+L) storage areas (M>L≥1 and L is an integer) in a storage device, for storing M pieces of data from M data sources (M≥2 and M is an integer). A data specifying unit specifies an L piece of data as write-target data, from among the M pieces of data from the M data sources. A write-destination specifying unit specifies within the (2M+L) storage areas, a storage area that is a write destination of the L piece of write-target data, from among storage areas excluding storage areas from which data is read during the L piece of write-target data is being written, storage areas into which data from each data source has been written last, and storage areas from which data from each data source has been read last. A write processing unit writes the L piece of write-target data into the specified storage area.

8 Claims, 12 Drawing Sheets

(52) U.S. Cl.
CPC .......... *G06F 3/0644* (2013.01); *G06F 3/0673* (2013.01); *G06F 9/3877* (2013.01)

(56) References Cited

U.S. PATENT DOCUMENTS

| | | | |
|---|---|---|---|
| 2008/0129868 A1* | 6/2008 | Simpson | G09G 5/003 348/500 |
| 2008/0170050 A1* | 7/2008 | Wang | G09G 5/395 345/204 |
| 2008/0192060 A1 | 8/2008 | Ogiso | |
| 2010/0007673 A1* | 1/2010 | Swic | G09G 5/001 345/539 |

FOREIGN PATENT DOCUMENTS

| | | |
|---|---|---|
| JP | 2012-34025 A | 2/2012 |
| JP | 2012-37690 A | 2/2012 |
| JP | 2012-182763 A | 9/2012 |
| JP | 2013-123171 A | 6/2013 |

* cited by examiner

US 10,528,278 B2

DATA PROCESSING APPARATUS, DATA PROCESSING METHOD, AND COMPUTER READABLE MEDIUM

TECHNICAL FIELD

The present invention relates to a technique for storing data in a storage device.

The following describes, as an example, a technique for storing video data from cameras (also referred to as camera video) in storage areas.

BACKGROUND ART

Patent Literature 1 discloses a technique for preventing the occurrence of tearing, using a plurality of buffers.

Tearing is a phenomenon where by a plurality of frames displayed on one screen, a rendered image is viewed in a distorted or flickering manner.

CITATION LIST

Patent Literature

Patent Literature 1: JP 2012-037690 A

SUMMARY OF INVENTION

Technical Problem

In Patent Literature 1, three or more buffers are prepared for one piece of video data, and a buffer that is a storage destination of the one piece of video data is selected from among the three or more buffers.

That is, a method of Patent Literature 1 has a problem that buffers, the quantity of which is three times or more the quantity of cameras which are supply sources of video data, are required and thus, when there are large quantities of cameras, a very large number of storage areas need to be reserved.

One of the main objects of the present invention is to solve problems such as that described above, and the main object of the present invention is to efficiently store data with a small number of storage areas.

Solution to Problem

A data processing apparatus according to the present invention includes:

a storage area setting unit to set (2M+L) storage areas ($M>L\geq1$ and L is an integer) in a storage device, for storing M pieces of data from M data sources ($M\geq2$ and M is an integer);

a data specifying unit to specify an L piece of data as write-target data, from among the M pieces of data from the M data sources;

a write-destination specifying unit to specify within the (2M+L) storage areas, a storage area that is a write destination of the L piece of write-target data, from among storage areas excluding storage areas from which data is read during the L piece of write-target data is being written, storage areas into which data from each data source has been written last, and storage areas from which data from each data source has been read last; and a write processing unit to write the L piece of write-target data into the storage area specified by the write-destination specifying unit.

Advantageous Effects of Invention

According to the present invention, since M pieces of data can be stored using only (2M+L) storage areas, the data can be efficiently stored with a small number of storage areas.

DESCRIPTION OF EMBODIMENTS

First and second embodiments describe a data processing apparatus that allocates (2M+L) storage areas ($M>L\geq1$ and L is an integer) for M pieces of data from M data sources ($M\geq2$ and M is an integer).

The first embodiment describes an example in which M=2 and L=1. That is, a data processing apparatus according to the first embodiment allocates five storage areas for two pieces of data. Then, the data processing apparatus according to the first embodiments specifies one of the two pieces of data as write-target data, and specifies a storage area that is a write destination of the one write-target data from among the five storage areas.

The second embodiment describes an example in which (2M+L) storage areas are allocated for M pieces of data. A data processing apparatus according to the second embodiment specifies, as write-target data, L pieces of data from among the M pieces of data, and specifies storage areas that are write destinations of the L pieces of write-target data from among the (2M+L) storage areas.

Note that, in the first and second embodiments, the data processing apparatus can also allocate three storage areas for each data source. That is, the data processing apparatus can also allocate 3M storage areas for M pieces of data from M data sources.

The data processing apparatuses according to the first and second embodiments select either one of a configuration of (2M+L) storage areas and a configuration of 3M storage areas, taking into account the data size of M pieces of data.

Note that the first and second embodiments describe M pieces of video data from M cameras as an example of M pieces of data from M data sources.

First Embodiment

Description of a Configuration

Figure 1:
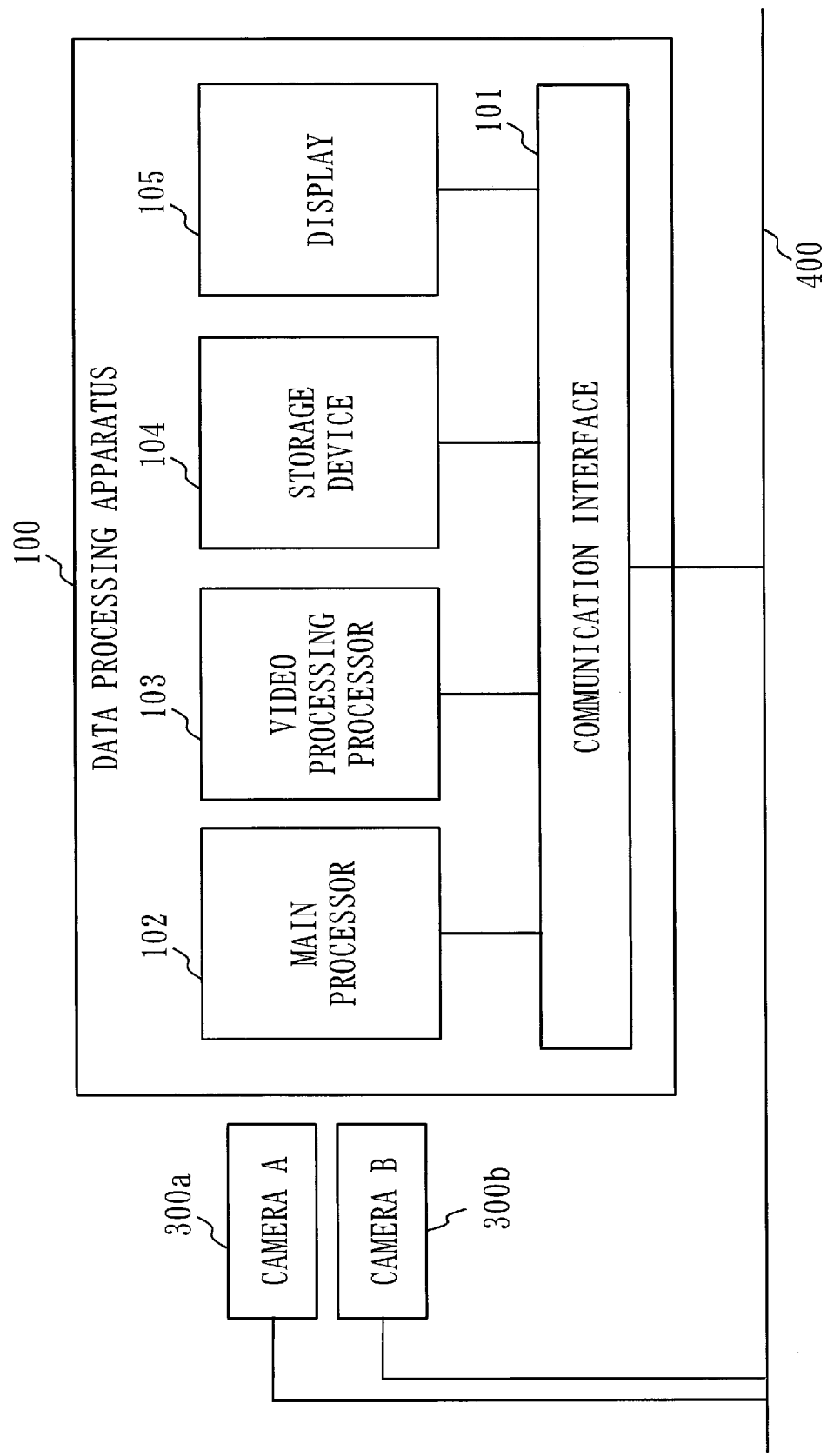
FIG. 1 is a diagram illustrating an example of hardware configuration of a data processing apparatus according to a first embodiment.

FIG. 1 illustrates an example of hardware configuration of a data processing apparatus 100 according to the present embodiment.

The data processing apparatus 100 according to the present embodiment is a computer.

The data processing apparatus 100 includes, as hardware, a communication interface 101, a main processor 102, a video processing processor 103, a storage device 104, and a display 105.

The communication interface 101 receives video data from a camera A 300a and a camera B 300b which are data sources through a communication channel 400. Note that when the camera A 300a and the camera B 300b do not need to be distinguished from each other, they are collectively represented as cameras 300.

The main processor 102 executes main programs.

The video processing processor 103 performs writing and reading of video data and graphics rendering.

The storage device 104 is used as a video data storage area. Namely, the storage device 104 is used as a buffer memory for storing video data. In addition, the storage device 104 is also used as a screen frame buffer. Furthermore, the storage device 104 also stores therein programs that are executed by the main processor 102 and the video processing processor 103.

The display 105 outputs video data.

Figure 2:
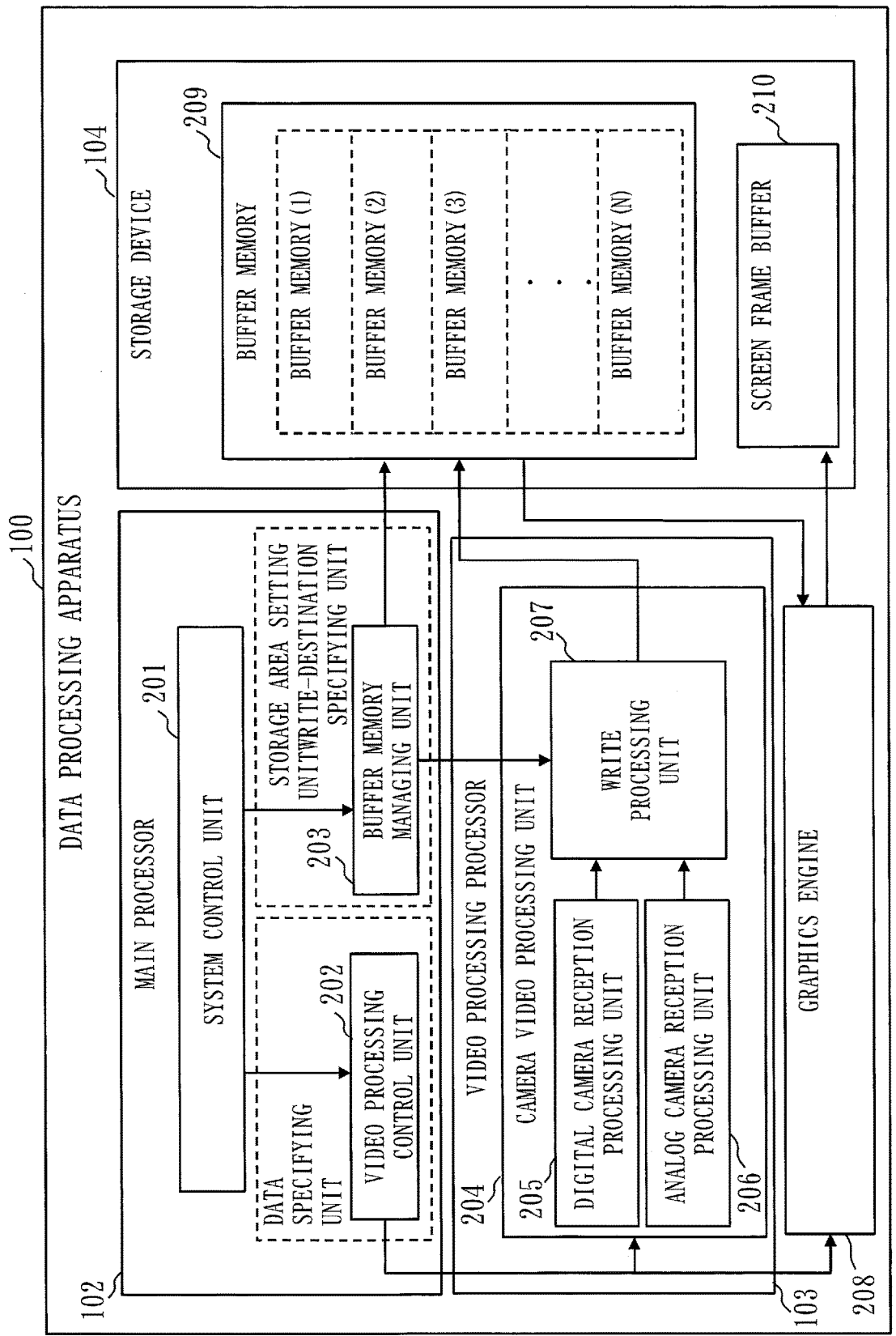
FIG. 2 is a diagram illustrating an example of functional configuration of the data processing apparatus according to the first embodiment.

FIG. 2 illustrates an example of functional configuration of the data processing apparatus 100 according to the present embodiment.

The main processor 102 executes a system control unit 201, a video processing control unit 202, and a buffer memory managing unit 203 which are the main programs.

The system control unit 201 controls the operation of the data processing apparatus 100. That is, the system control unit 201 controls the video processing control unit 202 and the buffer memory managing unit 203, and controls a digital camera reception processing unit 205, an analog camera reception processing unit 206, a write processing unit 207, and a graphics engine 208 through the control of the video processing control unit 202 and the buffer memory managing unit 203.

The video processing control unit 202 performs reception control of video data from cameras and control of the graphics engine 208. The video processing control unit 202 is an example of a data specifying unit. In addition, a process performed by the video processing control unit 202 corresponds to an example of a data specifying process.

The buffer memory managing unit 203 performs control to prevent the occurrence of tearing in displayed video. The buffer memory managing unit 203 corresponds to an example of a storage area setting unit and a write-destination specifying unit. In addition, a process performed by the buffer memory managing unit 203 corresponds to an example of a storage area setting process and a write-destination specifying process.

The video processing processor 103 executes a camera video processing unit 204 and the graphics engine 208.

The camera video processing unit 204 performs reception control of video data from the cameras 300 according to an instruction from the video processing control unit 202, and further performs initial settings and the like, related to the operation of the digital camera reception processing unit 205, the analog camera reception processing unit 206, and the write processing unit 207.

The graphics engine 208 renders graphics.

The camera video processing unit 204 includes the digital camera reception processing unit 205, the analog camera reception processing unit 206, and the write processing unit 207.

The digital camera reception processing unit 205 receives digital video data from the communication interface 101.

The analog camera reception processing unit 206 receives analog video data from the communication interface 101.

The write processing unit 207 writes the digital video data received by the digital camera reception processing unit 205 and the analog video data received by the analog camera reception processing unit 206 into the storage device 104.

As described, the data processing apparatus 100 according to the present embodiment accepts the reception of digital video data and the reception of analog video data, but may receive either video data for a plurality of channels.

The graphics engine 208 reads video data written into the storage device 104, performs image processing on the video data, and stores the video data image—processed in a screen frame buffer 210.

The storage device 104 includes a buffer memory 209 for temporarily holding received video data; and the screen frame buffer 210 for outputting video data image—processed to the display 105.

Each of the system control unit 201, the video processing control unit 202, the buffer memory managing unit 203, the camera video processing unit 204, the digital camera reception processing unit 205, the analog camera reception processing unit 206, and the write processing unit 207 is a program.

These programs are stored in the storage device 104. And the main processor 102 executes programs that realize the system control unit 201, the video processing control unit 202, and the buffer memory managing unit 203, and thereby performs the operation of the system control unit 201, the video processing control unit 202, and the buffer memory managing unit 203 which will be described later. In addition, the video processing processor 103 executes programs that realize the camera video processing unit 204, the digital camera reception processing unit 205, the analog camera reception processing unit 206, the write processing unit 207, and the graphics engine 208, and thereby performs the operation of the camera video processing unit 204, the digital camera reception processing unit 205, the analog camera reception processing unit 206, the write processing unit 207, and the graphics engine 208 which will be described later.

FIG. 2 schematically illustrates a state in which the main processor 102 executes the programs that realize the system control unit 201, the video processing control unit 202, and the buffer memory managing unit 203. In addition, FIG. 2 schematically illustrates a state in which the video processing processor 103 executes the programs that realize the camera video processing unit 204, the digital camera reception processing unit 205, the analog camera reception processing unit 206, the write processing unit 207, and the graphics engine 208.

Description of Operation

First, a buffer configuration of the data processing apparatus 100 according to the present embodiment will be described.

Figure 3:
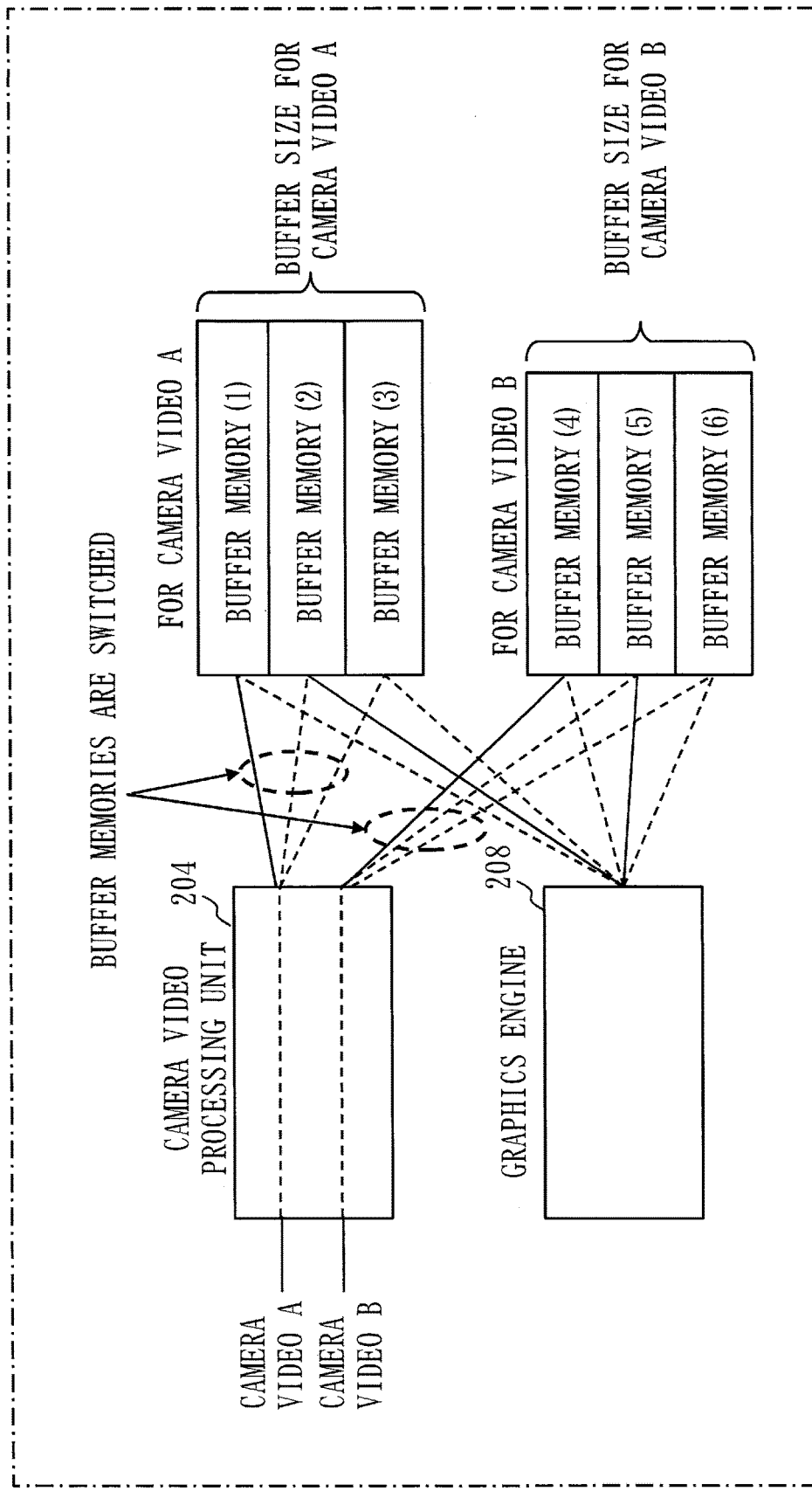
FIG. 3 is a diagram illustrating an example of a first buffer memory configuration according to the first embodiment.

In an environment in which the writing and reading of camera video are asynchronously performed, in order to avoid a conflict therebetween, as illustrated in FIG. 3, three buffer memories are required for each of the plurality of cameras 300. That is, when the number of cameras 300 to be used is M (M≥2), a total of 3M buffer memories are required. Here, each buffer memory indicates an area that stores data for one frame of camera video. That is, the size of buffer memories that store video data from the camera A 300a (camera video A) is the data size of the camera video A. In addition, the size of buffer memories that store video data from the camera B 300b (camera video B) is the data size of the camera video B. Note that the buffer memory configuration of FIG. 3 is referred to as a first buffer memory configuration.

Figure 4:
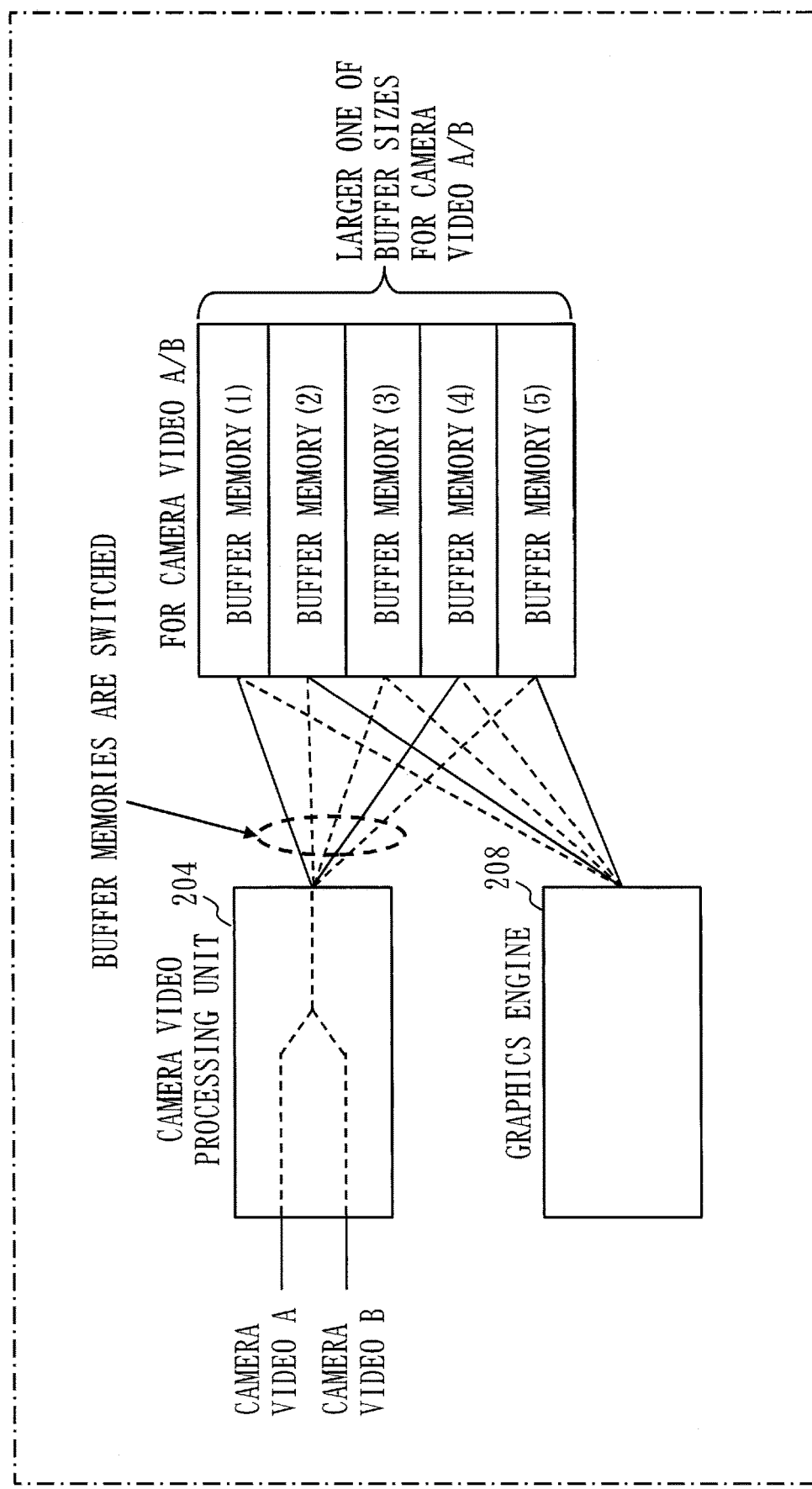
FIG. 4 is a diagram illustrating an example of a second buffer memory configuration according to the first embodiment.

On the other hand, as illustrated in FIG. 4, the write processing unit 207 limits the number of pieces of video data that can be simultaneously written into the buffer memory 209 among M pieces of video data from the M cameras 300 to one, based on an instruction from the video processing control unit 202. That is, the video processing control unit 202 specifies, as write-target data, one piece of video data from among the M pieces of video data from the M cameras 300. By this, the M pieces of video data can be stored with a total of (2M+1) buffer memories.

In addition, in the example of FIG. 4, the buffer memory managing unit 203 allocates the (2M+1) buffer memories as follows.

M buffer memories store M pieces of read-target video data, another M buffer memories store M pieces of video data most recently written, and the remaining one buffer memory stores one piece of write-target data specified by the video processing control unit 202. Note that the buffer memory configuration of FIG. 4 is referred to as second buffer memory configuration.

FIG. 4 illustrates an example of the second buffer memory configuration for a case in which the quantity M of cameras is two.

That is, camera video A from the camera A 300a and camera video B from the camera B 300b are stored in five buffer memories.

In this case, since two types of video data are stored with one type of buffer memories, the size of one buffer memory needs to be a size capable of storing one of the two pieces of video data that has a larger data size. In FIG. 4, the size of each buffer memory is the data size of the camera video A having a larger data size.

Hence, in the second buffer memory configuration illustrated in FIG. 4, the smaller the size ratio between a plurality of pieces of camera video, the more significantly the memory capacity can be reduced. On the other hand, when the size ratio between a plurality of pieces of camera video is large, unused memory areas partially occur, and thus, the total memory capacity to be used can be smaller with the first buffer memory configuration illustrated in FIG. 3.

Hence, the buffer memory managing unit 203 selects one of the first buffer memory configuration of FIG. 3 and the second buffer memory configuration of FIG. 4 that is used to form the buffer memory 209, on the basis of the quantity of cameras to be used and information about the buffer size for one frame of camera video. Specifically, when the size of each buffer memory for M cameras is represented as S[k] (k=0 to M−1 and arrangement is in ascending order), a selection criterion for selecting the second buffer memory configuration of FIG. 4 is defined by the following expression (1).

[Expression 1]

$$\frac{2(M-1)}{3} < \frac{\sum_{k=0}^{M-2} S[k]}{S[M-1]} \quad (M \geq 2) \quad (1)$$

In the examples of FIGS. 3 and 4, S[k] in expression (1) is S[0] and S[1]. S[0] is the size of buffer memories for the camera video B of FIG. 3. S[1] is the size of buffer memories for the camera video A of FIG. 3 (buffer memories for the camera video A/B of FIG. 4).

When two cameras are used, (M−1)=1 and S[M−2]=S[0], and thus, the left side of expression (1) is ⅔ and the right side is S[0]/S[1].

Hence, when the ratio between the size of buffer memories for the camera video A (i.e., the data size of the camera video A) and the size of buffer memories for the camera video B (i.e., the data size of the camera video B) is smaller than 3:2 (when a divided value on the right side is less than ⅔), the memory capacity can be reduced more with the buffer memory configuration of FIG. 4 than with the buffer memory configuration of FIG. 3. Hence, when expression (1) holds true, the buffer memory managing unit 203 selects the second buffer memory configuration of FIG. 4. Then, the buffer memory managing unit 203 sets the buffer memory 209 in the storage device 104 using the second buffer memory configuration.

On the other hand, when the ratio between the size of buffer memories for the camera video A (i.e., the data size of the camera video A) and the size of buffer memories for the camera video B (i.e., the data size of the camera video B) is greater than 3:2, the memory capacity can be reduced more with the buffer memory configuration of FIG. 3 than with the buffer memory configuration of FIG. 4. Hence, when expression (1) does not hold true, the buffer memory managing unit 203 selects the first buffer memory configuration of FIG. 3. Then, the buffer memory managing unit 203 sets the buffer memory 209 in the storage device 104 using the first buffer memory configuration.

Next, an example of operation of the data processing apparatus 100 will be described in detail.

Figure 6:
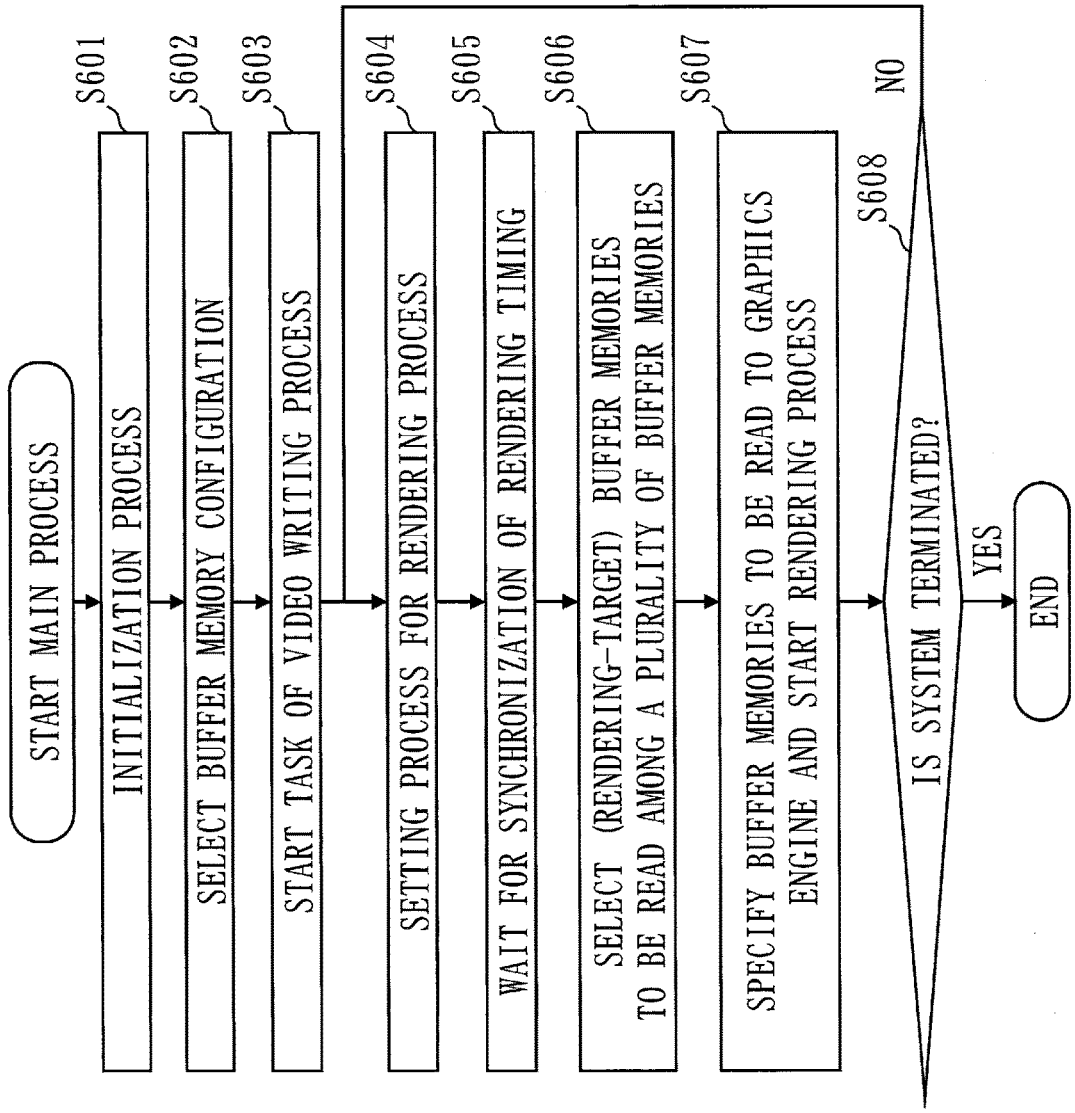
FIG. 6 is a flowchart diagram illustrating an example of a main process according to the first embodiment.
Figure 7:
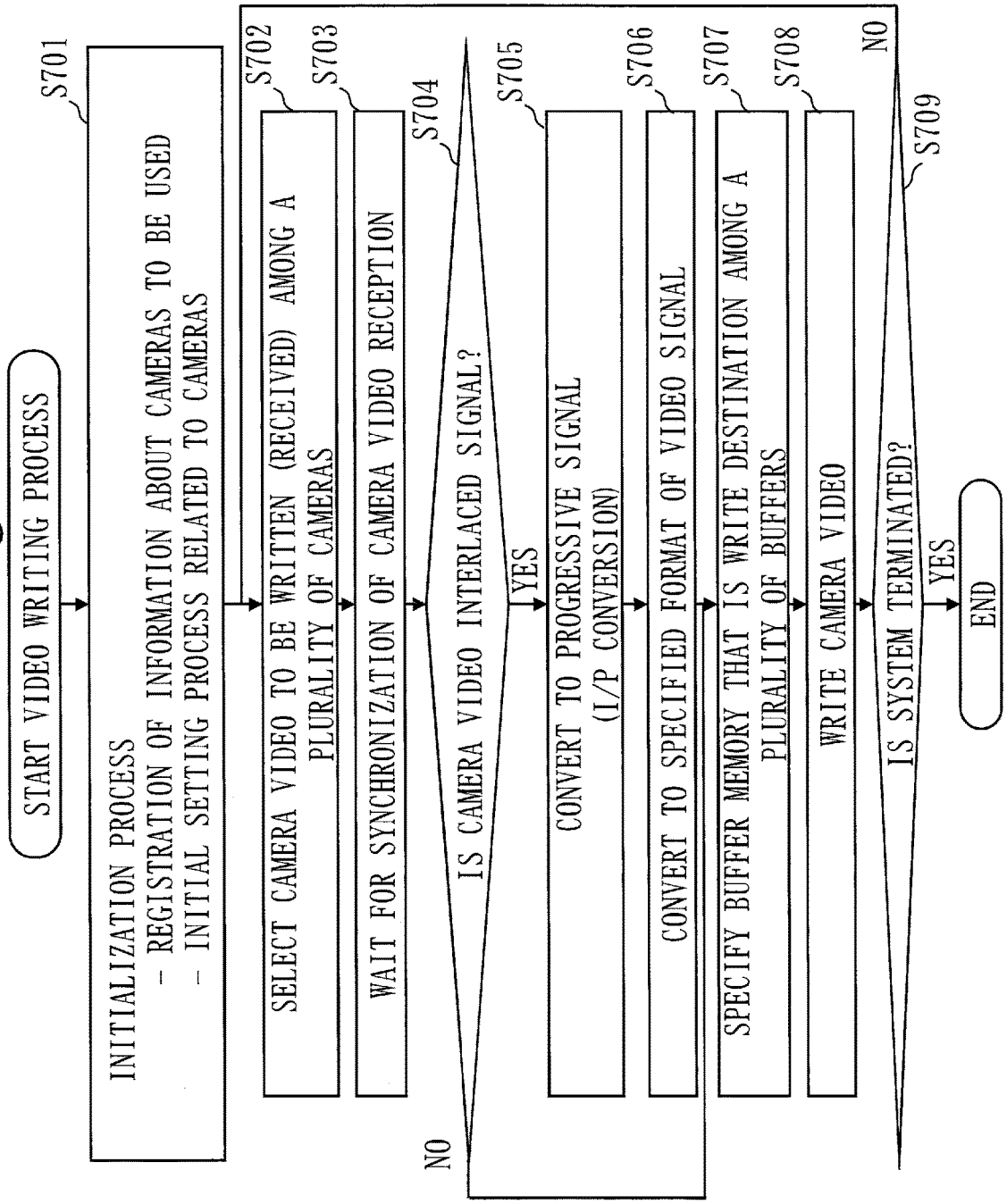
FIG. 7 is a flowchart diagram illustrating an example of a video writing process according to the first embodiment.

FIGS. 6 and 7 are flowcharts illustrating the example of operation of the data processing apparatus 100.

FIG. 6 is a flowchart illustrating a main process. FIG. 7 is a flowchart illustrating a video writing process which is operated as a different task than the main process.

Operation procedures illustrated in FIGS. 6 and 7 correspond to an example of a data processing method and a data processing program.

First, as a system initialization process, the system control unit 201 performs registration of information about the cameras 300, initialization of the hardware and the like. (step S601). The information registered here includes the data size of camera video of each camera 300.

Then, the buffer memory managing unit 203 selects a buffer memory configuration, according to the above-described expression (1) and on the basis of the registration information registered at step S601 (step S602).

Then, the buffer memory managing unit 203 sets the buffer memory 209 of the selected configuration in the storage device 104. In the following, description is made assuming that the buffer memory 209 is set using the configuration of FIG. 4.

Then, the system control unit 201 starts a task of a video writing process as a different task than the main process (step S603).

Note that a detail of the video writing process is illustrated in FIG. 7, and in the following, first, the video writing process will be described with reference to FIG. 7.

First, in an initialization process (step S701) after the start, the video processing control unit 202 controls the operation of the camera video processing unit 204 in accordance with cameras to be used. Specifically, when a digital camera is used, the system control unit 201 performs settings for the control of the digital camera reception processing unit 205, and when an analog camera is used, the system control unit 201 performs settings for the control of the analog camera reception processing unit 206.

Then, the video processing control unit 202 selects write-target camera video (step S702) and waits for synchronization of camera video reception (step S703).

Figure 5:
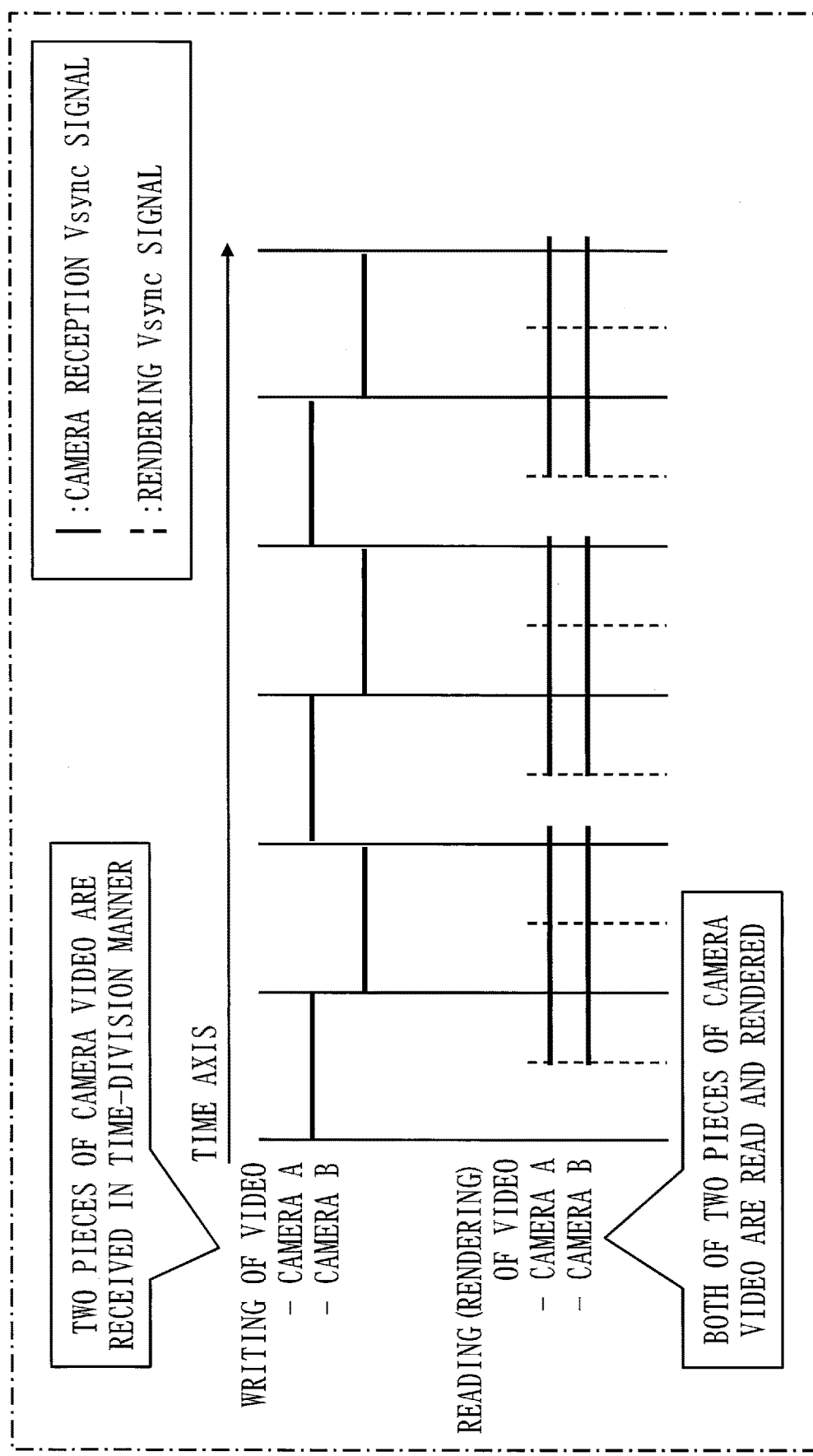
FIG. 5 is a diagram illustrating writing order and reading order for the second buffer memory configuration according to the first embodiment.

Here, the video processing control unit 202 switches the write-target camera video on a frame-by-frame basis and controls to receive a plurality of pieces of camera video in turn in a time-division manner. By this, as illustrated in FIG. 5, a plurality of pieces of camera video can be received with the quantity of simultaneous reception channels for camera video being limited to one.

Then, if received camera video is an interlaced signal (YES at step S704), since data of analog camera video and digital camera video is treated as a uniform data structure, the write processing unit 207 performs conversion to progressive video (step S705) and conversion of a video signal to a specified format (step S706). As the conversion to the specified format, the write processing unit 207 converts the camera video to digital video data in a pre-defined color format such as YUV422.

Then, the buffer memory managing unit 203 specifies a buffer memory that is a write destination of the write-target camera video (step S707).

The buffer memory managing unit 203 manages allocation state information indicating an allocation state of each of the (2M+1) buffer memories, and specifies a buffer memory that is a write destination of the write-target camera video by referring to the allocation state information.

Specifically, the buffer memory managing unit 203 specifies within the (2M+1) buffer memories, a buffer memory that is a write destination of the write-target camera video, from among buffer memories excluding buffer memories from which camera video is read during the write-target camera video is being written, buffer memories into which camera video from each data source has been written last, and buffer memories from which camera video from each data source has been read last.

The buffer memories from which camera video is read during the write-target camera video is being written, the buffer memories into which camera video from each data source has been written last, and the buffer memories from which camera video from each data source has been read last partially overlap. The buffer memory managing unit 203 specifies a buffer memory that is the write destination from among buffer memories that are obtained by excluding buffer memories obtained after eliminating the overlapping of those buffer memories.

Specification of a buffer memory that is the write destination by the buffer memory managing unit 203 will be described later using specific examples.

Then, the write processing unit 207 is notified by the buffer memory managing unit 203 about the number of the buffer memory specified at step S707, and writes the received write-target camera video into the corresponding buffer memory (step S708).

The data processing apparatus 100 repeatedly performs the above-described process until the system is terminated (YES at step S709), and writes a plurality of pieces of camera video into the buffer memory 209 whenever necessary.

On the other hand, going back to the main process again, a camera video rendering process which utilizes the graphics engine 208 will be described.

First, the video processing control unit 202 performs a setting process for starting a rendering process of the graphics engine 208 (step S604) and waits for synchronization of rendering timing for rendering-frame adjustment (step S605).

Then, when rendering timing has come, the buffer memory managing unit 203 selects the numbers of buffer memories that store rendering-target video data (step S606). Here, the buffer memory managing unit 203 selects buffer memories allocated with the latest frames of respective pieces of camera video whose writing is completed. Specifically, in the case of a camera that is not currently a write target, the buffer memory managing unit 203 selects a buffer memory into which a camera video of the camera has been written last time. On the other hand, in the case of a camera that is currently a write target, the buffer memory managing unit 203 selects, by the following method, a buffer memory into which camera video of the camera has been written last time. A scheme for notifying the main processor 102 of the completion of writing is provided in advance in the graphics engine 208. Then, when writing of camera video is completed before a certain period has elapsed from rendering timing, the buffer memory managing unit 203 selects a buffer memory in which the writing of the camera video is completed. When writing is not completed even after the certain period has elapsed from rendering timing, the buffer memory managing unit 203 selects a buffer memory into which a camera video of the camera has been written last time. By doing so, the buffer memory managing unit 203 can specify the latest frame of camera video.

Then, the buffer memory managing unit 203 notifies the graphics engine 208 of the numbers of the buffer memories selected at step S606, and starts a rendering process (step S607).

After the rendering process starts, the graphics engine 208 performs a rendering process for one screen, and reads video data from the buffer memories that are notified by the buffer memory managing unit 203. Then, the graphics engine 208 performs image processing on the read video data and thereby displays transformed video data.

The graphics engine 208 utilizes, for example, a texture mapping function and registers the video data as texture, and then applies a matrix operation such as a rotation matrix or a scaling matrix to the texture. Then, the graphics engine 208 stores a result of the matrix operation in the screen frame buffer 210 in the storage device 104. By this, the camera video is displayed rotated or scaled.

These processes are repeatedly performed until the system is terminated (YES at step S608), and a plurality of pieces of transformed camera video is displayed.

Figure 8:
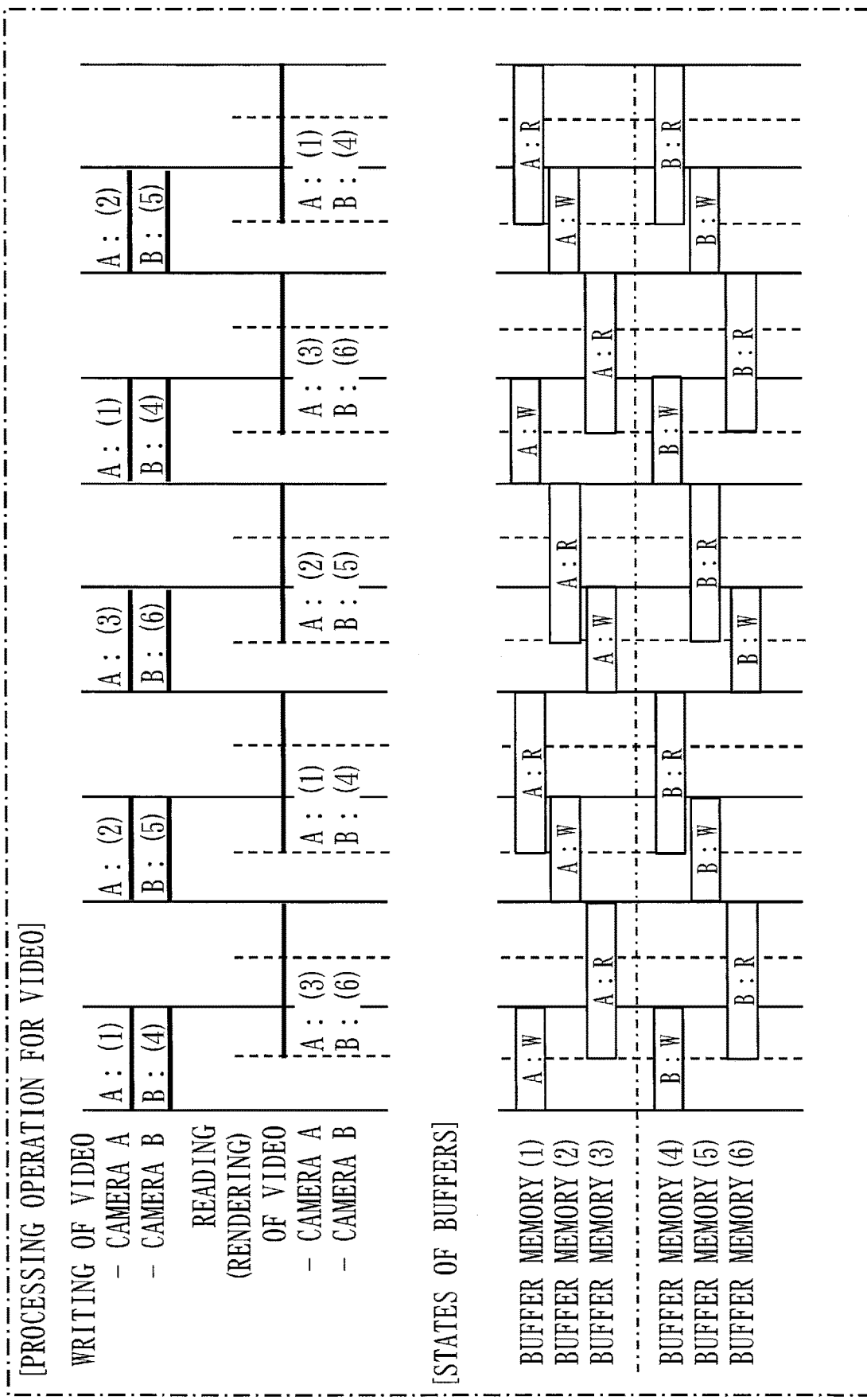
FIG. 8 is a diagram illustrating a writing procedure and a reading procedure for the first buffer memory configuration according to the first embodiment.

FIG. 8 illustrates a writing procedure and a reading procedure for the first buffer memory configuration.

Figure 9:
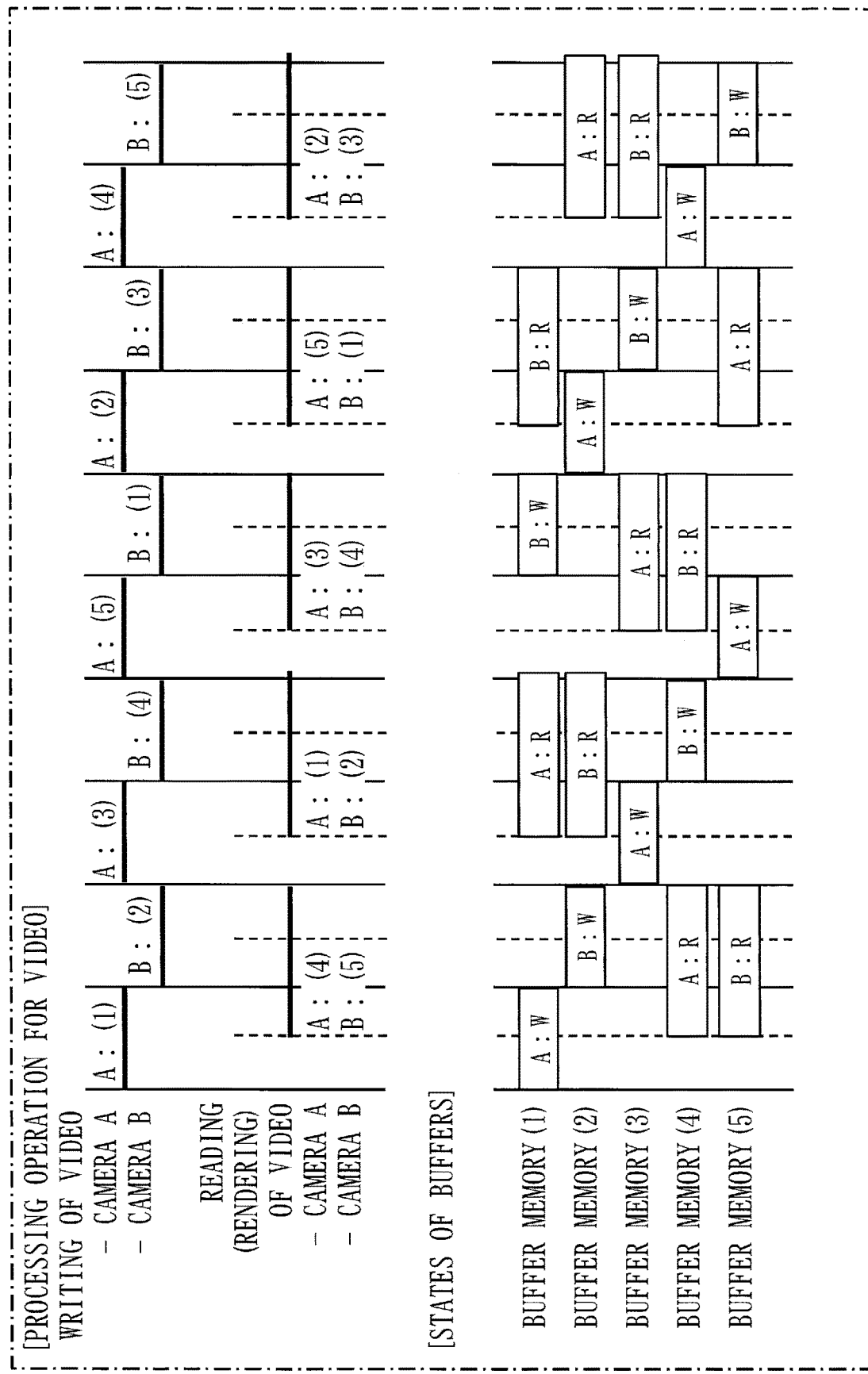
FIG. 9 is a diagram illustrating a writing procedure and a reading procedure for the second buffer memory configuration according to the first embodiment.

In addition, FIG. 9 illustrates a writing procedure and a reading procedure for the second buffer memory configuration.

In FIGS. 8 and 9, the quantity M of cameras is two.

In addition, in FIGS. 8 and 9, a horizontal direction indicates a passage of time. In addition, a time segment (a segment divided by solid lines) indicates a time slot.

In the first buffer memory configuration of FIG. 8, buffers (1) to (3) are allocated as buffer memories for the camera A 300a, and buffers (4) to (6) are allocated as buffer memories for the camera B 300b, by which camera video is stored in different buffer memories for different cameras. Note that in FIG. 8 "W" represents writing of camera video and "R" represents reading of camera video. In FIGS. 9 to 12 as well, likewise, "W" represents writing of camera video and "R" represents reading of camera video.

On the other hand, in the second buffer memory configuration of FIG. 9, five buffer memories in total are shared between the camera A 300a and the camera B 300b. Furthermore, the buffer memory managing unit 203 performs control such that writing of camera video from the camera A 300a does not occurs simultaneously with writing of camera video from the camera B 300b.

As described previously, in the second buffer memory configuration, the buffer memory managing unit 203 specifies a buffer memory that is a write destination of write-target camera video from among buffer memories excluding buffer memories from which camera video is read during the write-target camera video is being written, buffer memories into which camera video from each data source has been written last, and buffer memories from which camera video from each data source has been read last.

The following describes a method for selecting a buffer memory that is a write destination of camera video A:(3) of FIG. 9 when the camera video A:(3) is a write target. Buffer memories from which camera video is read during the camera video A:(3) is being written, are a buffer (1) and a buffer (2). In addition, buffer memories into which camera video from each data source has been written last, are the buffer (1) and the buffer (2). In addition, buffer memories from which camera video from each data source has been read last, are a buffer (4) and a buffer (5). Among the buffers (1) to (5), a buffer (3) obtained after excluding those buffer (1), buffer (2), buffer (4), and buffer (5) is selected as a buffer memory that is the write destination of the camera video A:(3).

Figure 10:
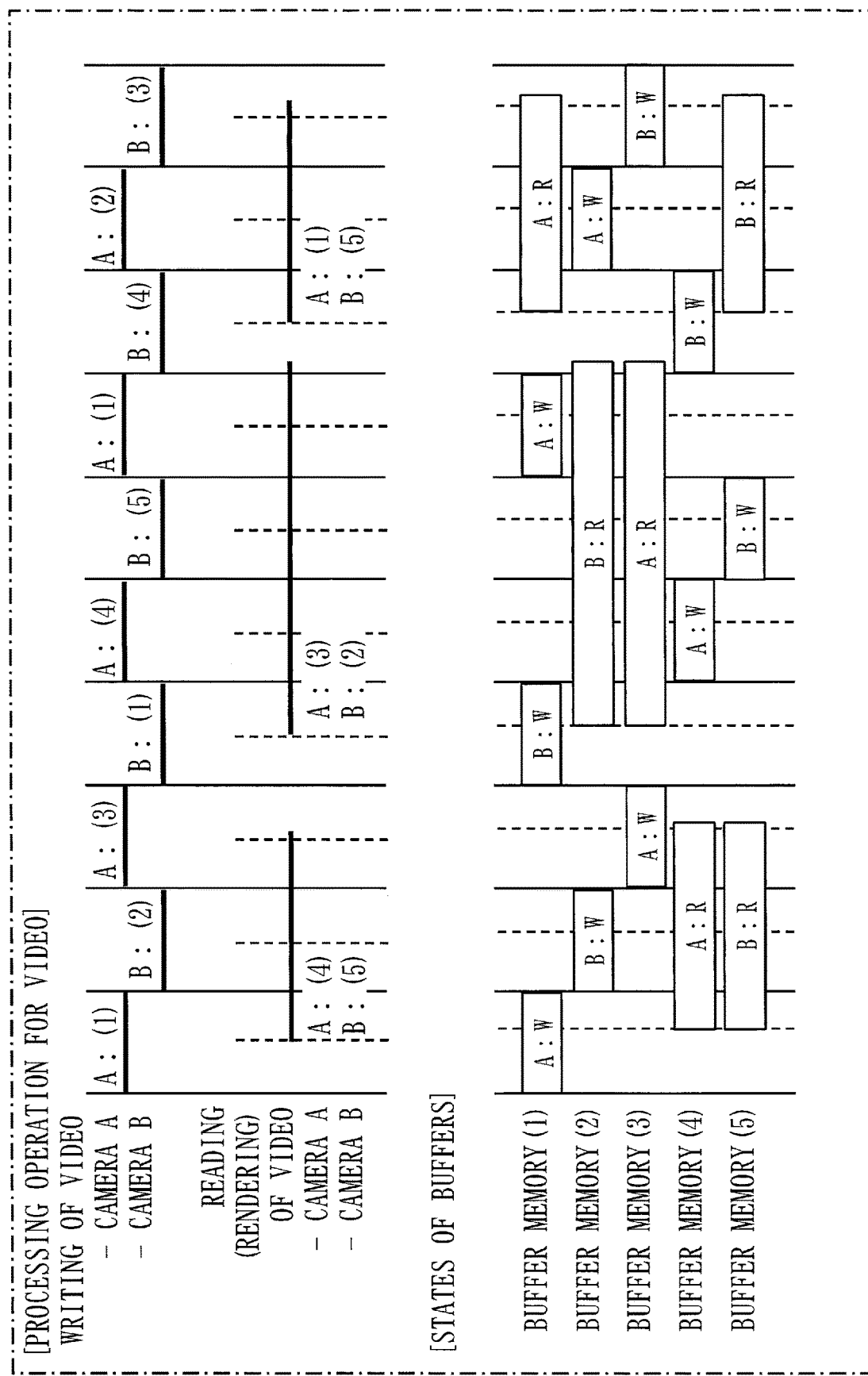
FIG. 10 is a diagram illustrating a writing procedure and a reading procedure for the second buffer memory configuration according to the first embodiment.

In addition, FIG. 10 illustrates a case in which, in the second buffer memory configuration, processing time of reading camera video is long.

In the case of FIG. 10 as well, selection of a buffer memory that is a write destination is performed in the same manner as in the case of FIG. 9.

The following describes a method for selecting a buffer memory that is a write destination of camera video A:(3) of FIG. 10 when the camera video A:(3) is a write target. Buffer memories from which camera video is read during the camera video A:(3) is being written, are a buffer (4) and a buffer (5). In addition, buffer memories into which camera video from each data source has been written last, are a buffer (1) and a buffer (2). In addition, buffer memories from which camera video from each data source has been read last, are the buffer (4) and the buffer (5). Among the buffers (1) to (5), a buffer (3) obtained after excluding those buffer (1), buffer (2), buffer (4), and buffer (5) is selected as a buffer memory that is the write destination of the camera video A:(3).

Figure 11:
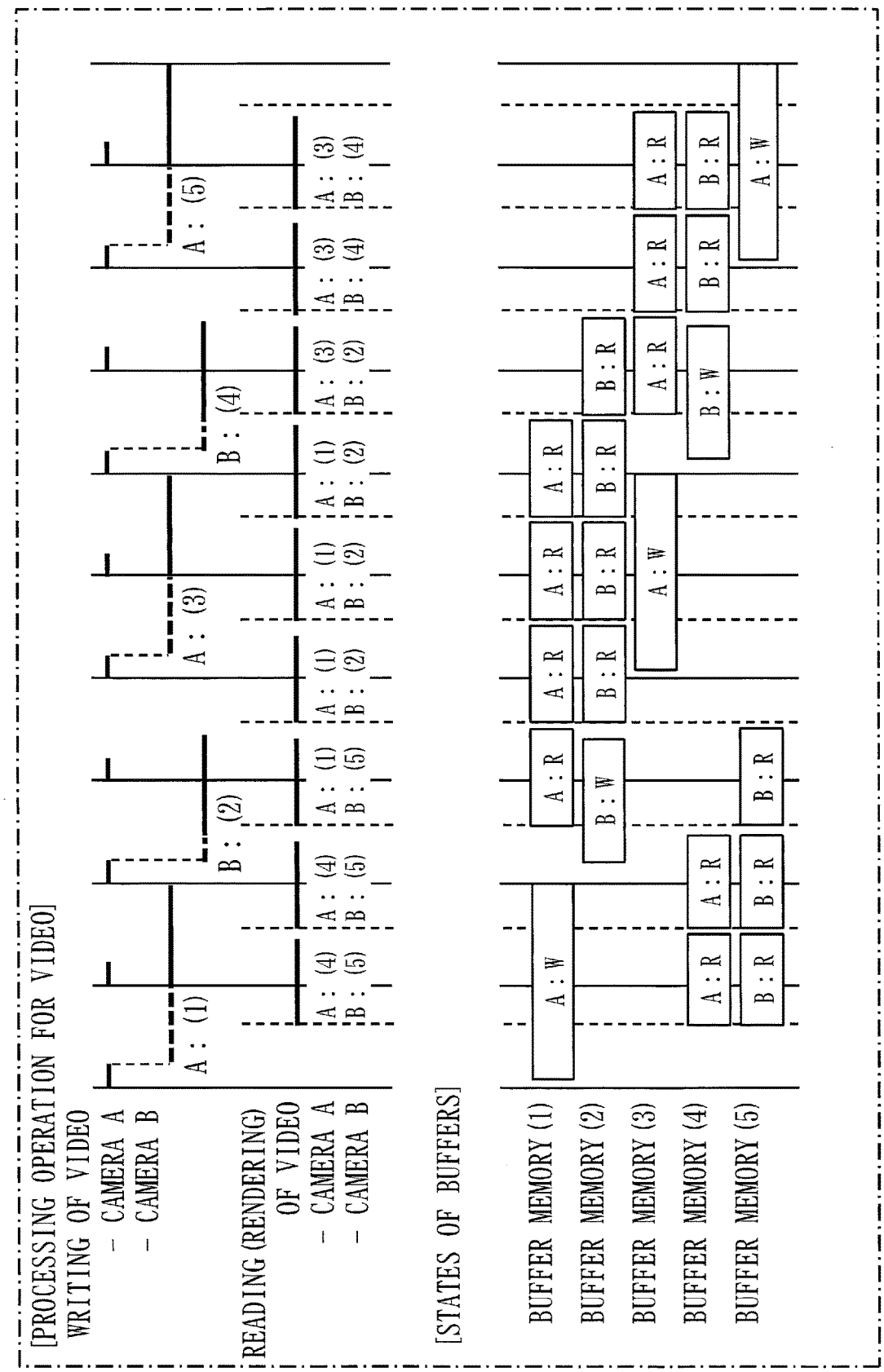
FIG. 11 is a diagram illustrating a writing procedure and a reading procedure for the second buffer memory configuration according to the first embodiment.

In addition, FIG. 11 illustrates a case in which, in the second buffer memory configuration, processing time of writing camera video is long.

In the case of FIG. 11 as well, selection of a buffer memory that is a write destination is performed in the same manner as in the case of FIG. 9.

The following describes a method for selecting a buffer memory that is a write destination of camera video A:(3) of FIG. 11 when the camera video A:(3) is a write target. Buffer memories from which camera video is read during writing of the camera video A:(3) is being written, are a buffer (1) and a buffer (2). In addition, buffer memories into which camera video from each data source has been written last, are the buffer (1) and the buffer (2). In addition, buffer memories from which camera video from each data source has been read last, are the buffer (1) and the buffer (2). Among the buffers (1) to (5), from among buffers (3) to (5) obtained after excluding those buffer (1) and buffer (2), a buffer memory that is the write destination of the camera video A:(3) is selected. In FIG. 11, the buffer (3) is selected as a buffer memory that is the write destination of the camera video A:(3).

Figure 12:
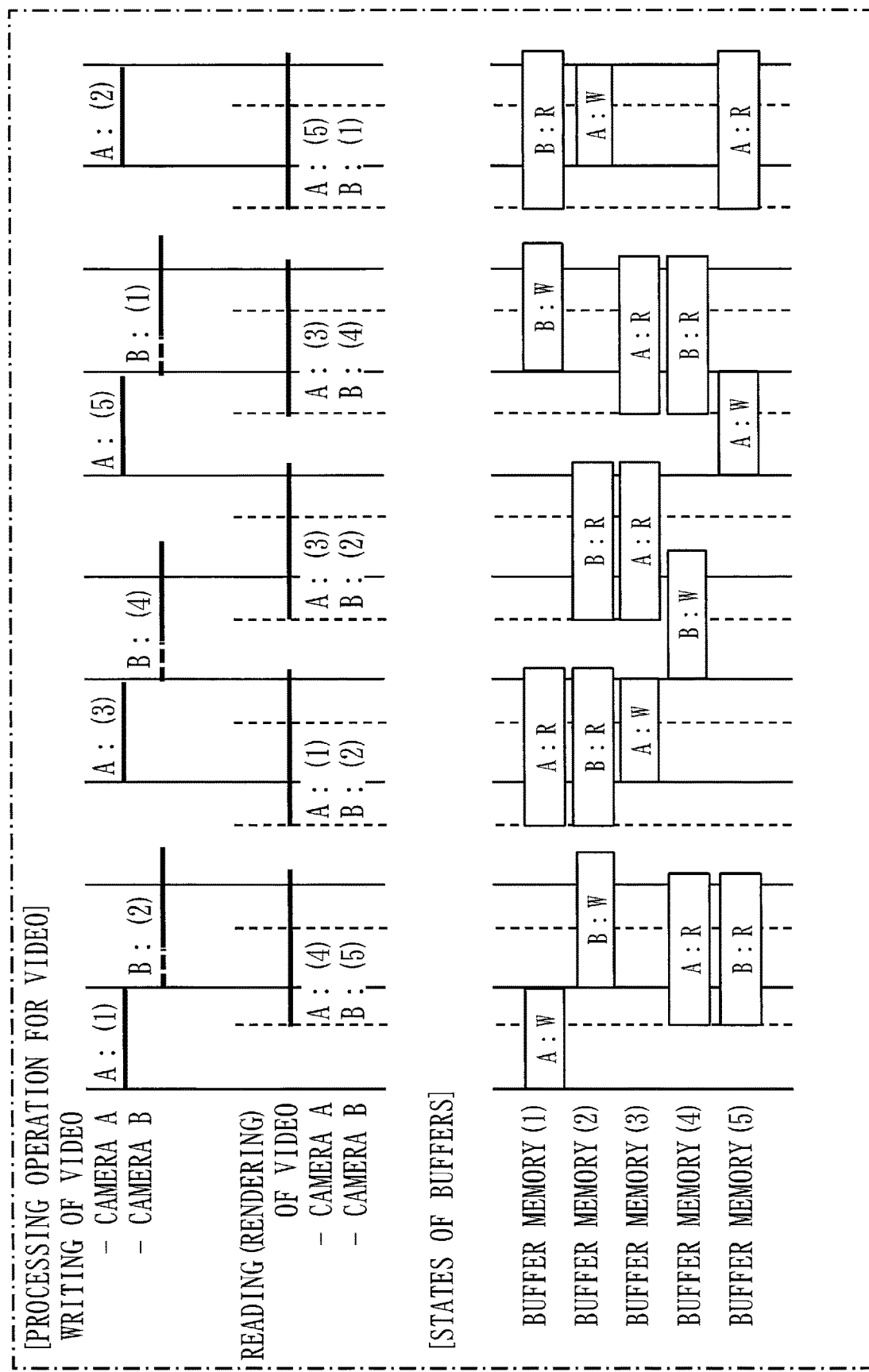
FIG. 12 is a diagram illustrating a writing procedure and a reading procedure for the second buffer memory configuration according to the first embodiment.

In addition, FIG. 12 illustrates a case in which, in the second buffer memory configuration, the processing time for writing of each camera video varies depending on the camera video reception timing.

In the case of FIG. 12 as well, selection of a buffer memory that is a write destination is performed in the same manner as in the case of FIG. 9.

The following describes a method for selecting a buffer memory that is a write destination of camera video A:(3) of FIG. 12 when the camera video A:(3) is a write target. Buffer memories from which camera video is read during the camera video A:(3) is being written, are a buffer (1) and a buffer (2). In addition, buffer memories into which camera video from each data source has been written last, are the buffer (1) and the buffer (2). In addition, buffer memories from which camera video from each data source has been read last, are the buffer (1) and the buffer (2). Among the buffers (1) to (5), from among buffers (3) to (5) obtained after excluding those buffer (1) and buffer (2), a buffer memory that is the write destination of the camera video A:(3) is selected. In FIG. 12, the buffer (3) is selected as a buffer memory that is the write destination of the camera video A:(3).

As described above, in all of the cases of FIGS. 9 to 12, by the same control, the writing into and reading from buffer memories can be asynchronously managed without a conflict.

Description of Advantageous Effects of the Embodiment

As described above, according to the present embodiment, since M pieces of data can be stored using only (2M+1) storage areas, the data can be efficiently stored with a small number of storage areas.

Particularly, in a system that performs display by performing scaling or rotation control on a plurality of pieces of camera video, tearing that occurs when the writing and reading of camera video are asynchronously performed can be prevented, and memory capacity required to hold video data can be reduced.

In addition, in the present embodiment, a buffer memory configuration with a smaller memory capacity used can be selected on the basis of the quantity of cameras and buffer size information for camera video that depends on resolution.

Second Embodiment

A data processing apparatus 100 according to the present embodiment will be described.

Note that the configurations of the data processing apparatus 100 according to the present embodiment are as illustrated in FIGS. 1 and 2.

In addition, an example of operation of the data processing apparatus 100 according to the present embodiment is as illustrated in FIGS. 6 and 7.

In the following, differences from the first embodiment are mainly described. Matters that are not described below are the same as those of the first embodiment.

In the first embodiment, as an example of the second buffer memory configuration, (2M+1) buffer memories are disposed for M cameras, and write-target data is one piece of camera video.

In the present embodiment, as a second buffer memory configuration, (2M+L) buffer memories are disposed for M cameras, and write-target data is L pieces of camera video. Note that, as described previously, M>L≥1 and L is an integer.

That is, in the present embodiment, the video processing control unit 202 specifies, as write-target data, L pieces of camera video (L=1 to (M−1)) from among M pieces of camera video from M cameras 300. In addition, the buffer memory managing unit 203 specifies buffer memories that are the write destinations of the L pieces of write-target data from among the (2M+L) buffer memories. Then, the write processing unit 207 writes the L pieces of write-target data into the L buffer memories specified by the buffer memory managing unit 203.

In addition, in the present embodiment as well, in the first buffer memory configuration, 3M buffer memories are disposed for M cameras.

The buffer memory managing unit 203 selects either one of the first buffer memory configuration and the second buffer memory configuration, using a similar criterion to that illustrated in the first embodiment. Specifically, in the present embodiment, the buffer memory managing unit 203 selects either one of the first buffer memory configuration and the second buffer memory configuration, using the following expression (2) as a selection criterion. Note that each symbol illustrated in expression (2) is the same as that described for expression (1) and thus description thereof is omitted.

[Expression 2]

$$\frac{2M+L-3}{3} < \frac{\sum_{k=0}^{M-2} S[k]}{S[M-1]} \quad (M > L \geq 1) \quad (2)$$

In addition, a method for specifying a buffer memory that is a write destination of write-target camera video is also substantially the same as that illustrated in the first embodiment.

That is, the buffer memory managing unit 203 specifies within (2M+L) buffer memories, buffer memories that are the write destinations of L pieces of write-target camera video, from among buffer memories excluding buffer memories from which camera video is read during the L pieces of write-target camera video is being written, buffer memories into which camera video from each data source has been written last, and buffer memories from which camera video from each data source has been read last.

Then, the write processing unit 207 writes the L pieces of write-target camera video into the buffer memories specified by the buffer memory managing unit 203.

As described above, according to the present embodiment, since M pieces of data can be stored using only (2M+L) storage areas, the data can be efficiently stored with a small number of storage areas.

In addition, since L pieces of data can be written at a time, an increase in the speed of a writing process is achieved.

Description of a Hardware Configuration

Finally, supplemental remarks on the hardware configuration of the data processing apparatus 100 will be made.

The main processor 102 and the video processing processor 103 which are illustrated in FIGS. 1 and 2 are integrated circuits (ICs) that perform processing.

The main processor 102 is, for example, a central processing unit (CPU) or a digital signal processor (DSP), and the video processing processor 103 is, for example, a graphics processing unit (GPU).

The storage device 104 is a random access memory (RAM), a read only memory (ROM), a flash memory, a hard disk drive (HDD) or the like.

The communication interface 101 includes a receiver that receives data and a transmitter that transmits data.

The communication interface 101 is, for example, a communication chip or a network interface card (NIC).

The display 105 is, for example, a liquid crystal display (LCD).

In addition, the storage device 104 also stores therein an operating system (OS).

Then, at least a part of the OS is executed by the main processor 102 and the video processing processor 103.

The main processor 102 executes a program that realizes the functions of the system control unit 201, the video processing control unit 202, and the buffer memory managing unit 203 while executing at least a part of the OS.

In addition, the video processing processor 103 also executes a program that realizes the functions of the camera video processing unit 204, the digital camera reception processing unit 205, the analog camera reception processing unit 206, the write processing unit 207, and the graphics engine 208 while executing at least a part of the OS.

In addition, information, data, signal values, and variable values that indicate processing results of the system control unit 201, the video processing control unit 202, the buffer memory managing unit 203, the camera video processing unit 204, the digital camera reception processing unit 205, the analog camera reception processing unit 206, the write processing unit 207, and the graphics engine 208 are stored in the storage device 104, or a register or a cache memory in the main processor 102 or the video processing processor 103.

In addition, the programs that realize the functions of the system control unit 201, the video processing control unit 202, the buffer memory managing unit 203, the camera video processing unit 204, the digital camera reception processing unit 205, the analog camera reception processing unit 206, the write processing unit 207, and the graphics engine 208 may be stored in a portable storage medium such as a magnetic disk, a flexible disk, an optical disc, a compact disc, a Blu-ray (registered trademark) Disc, or a DVD.

In addition, the system control unit 201, the video processing control unit 202, the buffer memory managing unit 203, the camera video processing unit 204, the digital camera reception processing unit 205, the analog camera reception processing unit 206, the write processing unit 207, and the graphics engine 208 may be read as "circuits" "steps", "procedures", or "processes".

In addition, the data processing apparatus 100 may be realized by an electronic circuit such as a logic integrated circuit (IC), a gate array (GA), an application specific integrated circuit (ASIC), or a field-programmable gate array (FPGA).

In this case, each of the system control unit 201, the video processing control unit 202, the buffer memory managing unit 203, the camera video processing unit 204, the digital camera reception processing unit 205, the analog camera reception processing unit 206, the write processing unit 207, and the graphics engine 208 is realized as a part of the electronic circuit.

Note that a processor and the above-described electronic circuit are also collectively referred to as processing circuitry.

REFERENCE SIGNS LIST

100: data processing apparatus, 101: communication interface, 102: main processor, 103: video processing processor, 104: storage device, 105: display, 201: system control unit, 202: video processing control unit, 203: buffer memory managing unit, 204: camera video processing unit, 205: digital camera reception processing unit, 206: analog camera reception processing unit, 207: write processing unit, 208: graphics engine, 209: buffer memory, 210: screen frame buffer, 300: camera, 400: communication channel.

The invention claimed is:

1. A data processing apparatus comprising:
processing circuitry to:
set (2M+L) storage areas (M>L≥1 and L is an integer) in a storage device, for storing M pieces of data from M data sources (M≥2 and M is an integer);
specify an L piece of data as write-target data, from among the M pieces of data from the M data sources;
specify within the (2M+L) storage areas, a storage area that is a write destination of the L piece of write-target data, from among storage areas excluding storage areas from which data is read during the L piece of write-target data is being written, storage areas into which data from each data source has been written last, and storage areas from which data from each data source has been read last; and
write the L piece of write-target data into the storage area specified.

2. The data processing apparatus according to claim 1, wherein the processing circuitry sets the (2M+L) storage areas in the storage device, each of the storage areas having a size corresponding to a data size of largest data among the M pieces of data.

3. The data processing apparatus according to claim 2, wherein the processing circuitry:
selects either one of 3M storage areas in which three storage areas of a size corresponding to a data size of corresponding data are allocated for each data source, and the (2M+L) storage areas, as storage areas for storing the M pieces of data from the M data sources; and
sets the (2M+L) storage areas in the storage device when the (2M+L) storage areas is selected.

4. The data processing apparatus according to claim 3, wherein the processing circuitry selects either one of the 3M storage areas and the (2M+L) storage areas, based on a divided value obtained by dividing a sum total of data sizes of data other than the largest data among the M pieces of data by the data size of the largest data.

5. The data processing apparatus according to claim 4, wherein the processing circuitry selects the (2M+L) storage areas when the divided value is less than $\{(2M+L-3)/3\}$.

6. The data processing apparatus according to claim 1, wherein the processing circuitry sets the (2M+L) storage areas in the storage device, for storing M pieces of video data from M cameras which is the M data sources.

7. A data processing method comprising:
setting (2M+L) storage areas (M>L≥1 and L is an integer) in a storage device, for storing M pieces of data from M data sources (M≥2 and M is an integer);
specifying an L piece of data as write-target data, from among the M pieces of data from the M data sources;
specifying within the (2M+L) storage areas, a storage area that is a write destination of the L piece of write-target data, from among storage areas excluding storage areas from which data is read during the L piece of write-target data is being written, storage areas into which data from each data source has been written last, and storage areas from which data from each data source has been read last; and
writing the L piece of write-target data into the storage area that is the write destination.

8. A non-transitory computer readable medium storing a data processing program causing a computer to perform:
a storage area setting process of setting (2M+L) storage areas (M>L≥1 and L is an integer) in a storage device, for storing M pieces of data from M data sources (M≥2 and M is an integer);
a data specifying process of specifying an L piece of data as write-target data, from among the M pieces of data from the M data sources;
a write-destination specifying process of specifying within the (2M+L) storage areas, a storage area that is a write destination of the L piece of write-target data, from among storage areas excluding storage areas from which data is read during the L piece of write-target data is being written, storage areas into which data from each data source has been written last, and storage areas from which data from each data source has been read last; and
a writing process of writing the L piece of write-target data into the storage area specified in the write-destination specifying process.

* * * * *